United States Patent [19]
Stahl et al.

[11] Patent Number: 6,038,826
[45] Date of Patent: Mar. 21, 2000

[54] STACK AND PACKAGE OF LAMINATED SHINGLES

[75] Inventors: Kermit E. Stahl, North Wales; Michael J. Noone, Wayne; Joseph Quaranta, Yardley, all of Pa.

[73] Assignee: CertainTeed Corporation, Valley Forge, Pa.

[21] Appl. No.: 09/087,572

[22] Filed: May 29, 1998

[51] Int. Cl.[7] .................................................. B32B 11/00
[52] U.S. Cl. .............................. 52/554; 52/540; 52/555; 52/557
[58] Field of Search .............................. 52/554, 540, 555, 52/557, 518

[56] References Cited

U.S. PATENT DOCUMENTS

| | | | |
|---|---|---|---|
| 1,776,949 | 9/1930 | Lumbard | 52/540 |
| 3,613,328 | 10/1971 | Morgan et al. | |
| 3,624,975 | 12/1971 | Morgan et al. | |
| 3,921,358 | 11/1975 | Bettoli | 52/555 |
| 4,274,243 | 6/1981 | Corbin et al. | 52/557 |
| 4,717,614 | 1/1988 | Bondoc et al. | 52/557 |
| 5,181,361 | 1/1993 | Hannah et al. | |
| 5,209,802 | 5/1993 | Hannah et al. | 52/540 |
| 5,287,669 | 2/1994 | Hannah et al. | |
| 5,375,491 | 12/1994 | Hannah et al. | |
| 5,400,558 | 3/1995 | Hannah et al. | |

Primary Examiner—Carl D. Friedman
Assistant Examiner—Dennis L. Dorsey
Attorney, Agent, or Firm—Paul & Paul

[57] ABSTRACT

This invention is directed to a multi-layer laminated shingle, wherein each shingle layer comprises granule and bituminous coated web, with the layers laminated together and with the butt zone of the base layer disposed against a bottom surface of the tab zone of the secondary layer and with the tab zone of the base layer disposed against the bottom surface of the butt zone of the secondary layer. The shingle lends itself to having tabs spaced by voids. Because the tabs in the base layer are inverted, the base layer's butt zone is visible through voids in the tabs of the secondary layer. The method of making the shingle lends itself to complementally cutting out the tabs of two side-by-side shingles from a given line. Enhanced nailing area is provided, and stacking of shingles for packaging is facilitated.

14 Claims, 3 Drawing Sheets

STACK AND PACKAGE OF LAMINATED SHINGLES

BACKGROUND OF THE INVENTION

In the art of shingle manufacture, it has been known that laminated shingles may be prepared using separate layers. Each layer is constructed, generally of a bituminous coated web, with granules applied to an upper surface thereof.

The two shingle layers are then laminated together, by application of an adhesive, generally a bituminous material, to the back of the secondary layer, which is then applied over the base layer, whereby the adhesive secures the layers together, sandwiching granules from the top of the base layer therebetween. Examples of laminated shingles include those disclosed in U.S. Pat. Nos. 5,181,361 and 5,287,669, for example.

One prior art process for producing a laminated shingle is disclosed in FIG. 1 hereof, which will hereinafter be discussed in greater detail.

SUMMARY OF THE INVENTION

The present invention is directed toward providing a multi-layer laminated shingle in which the base layer is inverted relative to the secondary layer. This allows for the butt zone of the base layer to be visible through slots or other voids between adjacent tabs of the top, or secondary layer. The layers of shingle are preferably complementally cut from a single sheet of material. The base layer thereby has tab and butt portions which traverse butt and tab portions of the secondary shingle layer, respectively. Improved nailing or other fastener height is provided. The invention lends itself toward savings in shingle material, improved stacking for packaging purposes and easier installation onto a roof upon being removed from the packaging.

OBJECTS OF THE INVENTION

Accordingly, it is a primary object of this invention to provide a novel stack and package of multi-layer laminated shingles.

It is a further object of this invention to provide a stack and package of laminated shingles, each having a base layer and a secondary layer, wherein the base layer is of "full height"; namely, transcending the full height of the secondary layer.

It is an object of this invention to accomplish the above objects, wherein the shingles are made to facilitate material utilization efficiency.

It is yet another object of this invention to provide a novel stack of laminated shingles.

Other objects and advantages of the present invention will be readily apparent upon the reading of the following brief descriptions of the drawing figures, detailed descriptions of the preferred embodiments and the appended claims.

BRIEF DESCRIPTIONS OF DRAWING FIGURES

DETAILED DESCRIPTION OF THE PRIOR ART

Figure 1:
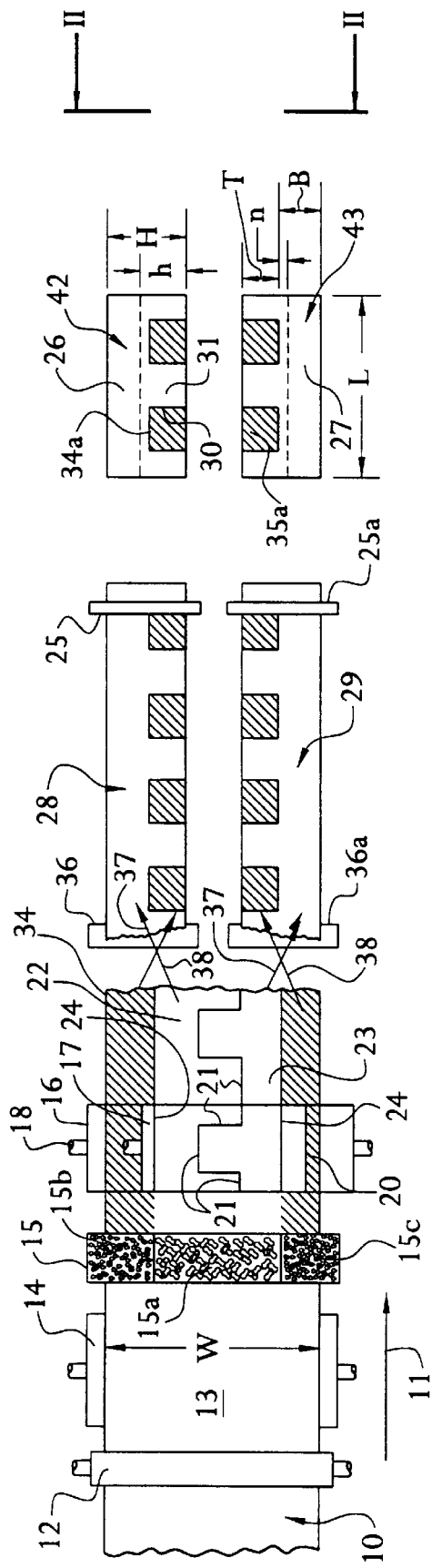
FIG. 1 is a schematic top plan view of an assembly line for the manufacture of shingles in accordance with the prior art.

Referring now to the drawings in detail, reference is first made to FIG. 1, wherein a substantially continuous sheet of web 10 is provided, travelling generally in the path indicated for the arrow 11, from left to right, with the web then passing through a coating zone 12, whereby pairs of rollers or other applicators, dip tanks or the like, apply a bituminous coating to the sheet of web 10. The bituminous coated web 13 may pass over suitable backcoating roller 14, as desired resulting in a bituminous coated web between the upper and lower surfaces of the sheet prior to delivery of the sheet to a granule applicator. The coated web 13 then passes beneath a granule applicator 15, which may be of the hopper type, containing granules for distribution along the web 13 via slots or the like (not shown) at the bottom of the hopper 15. The hopper 15 has a section 15a for distributing lighter granules, if desired, and optionally sections 15b and 15c for distributing darker granules, if desired.

The web 13 then passes between a pair of opposed rollers 16, 17, carried on appropriate respective shafts 18, 20.

The roller 17 has cutting blades 21, 24 on its surface, to cut the sheet 13 into two side-by-side, complementally configured sub-sheets 22, 23 and two edge strips 34, 35 of shingle material outside sub-sheets 22, 23. The sub-sheets 22, 23 and edge strips 34, 35 then pass over suitable adhesive applicators 36, 36a for applying a bitumin or other adhesive to a lower surface thereof by means of an applicator roll 36, 36a or the like (shown in FIG. 1 between fragmentally illustrated ends of sub-sheets 22, 23 and shingle strips 28, 29). The edge strips 34, 35 are generally of a height "h", half the height H for the sub-sheets 22, 23. These strips 34, 35 are then passed beneath applicators 36, 36a of adhesive. The sub-sheets (or layers) 22, 23, with the adhesive on lower surfaces thereof, are brought together to overlie edge strips 34, 35, as shown by arrows 37, 38, after shingle layers 26, 27 are delivered into position, to form continuous laminated shingle strips 28, 29, which then pass beneath suitable knife blades 25, 25a or the like, which cut the laminated shingle strips 28, 29 into discrete shingles 42, 43, generally of a length L and height H from an original sheet width W.

In the embodiment shown for FIG. 1, the shingle layers 26, 27 have voids 30 spacing tabs 31 from each other.

It will then be seen that the secondary shingle layers 26, 27, when combined with the shingle layers 34a, 35a, have portions of the shingle layers 34a, 35a, visible through the voids 30 between tabs 31, as shown at the right end of FIG. 1. Where, for example, it is desired that portions of surfaces of layers 34a, 35a are visible through voids 30, for the shingles 42, 43, such visible surfaces may be surfaces that have darker colored granules relative to perhaps lighter granules applied to the upper surfaces of the sheet 13 by granule applicator sections 15b and 15c, resulting in darker appearing shingle surfaces between visible tabs of shingles 42, 43 with lighter granules on the visible tab surfaces.

In making shingles in accordance with FIG. 1, for example, with respect to shingles having a length L of 36 inches and a height H of 12 inches for shingles having a tab size T of 5 inches and a butt height B of 7 inches, the base layer 34a or 35a will normally be of a height "h" of 6 inches, or half the shingle height H. Therefore, when lower edges of the shingle, for example shingle 43, at the right end of FIG. 1 are formed such that layers 35a and 27 are aligned, the nailing zone "n" is of a height of 1 inch, forming a nailing zone 1 inch high completely across the 36 inch length L of finished shingle 43. The same applies for shingle 42.

Figure 2:
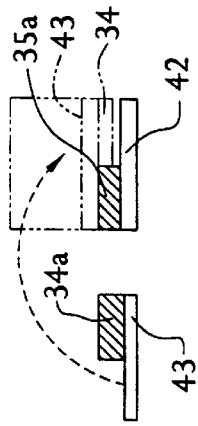
FIG. 2 is an end elevation of a pair of shingles, taken generally along the line II—II of FIG. 1, and wherein there is shown in phantom, the manner in which shingles are stacked for packaging.

With reference now to FIG. 2, it will be seen that in stacking shingles into a package, a shingle 43 will first be flipped over as shown in phantom in FIG. 2, so that the half-size base layers 34a, 35a may be stacked as shown in FIG. 2. While this provides a convenience from the point of view of stacking height, it requires a re-orienting both as shown by the arrow of FIG. 2 and also end-over-end, for the shingle 43 as indicated, followed by an opposite re-orienting of the shingle 43 as the same is removed from the stack for installation on a roof, by a roofer.

It will further be understood that shingles of different heights H may be constructed in accordance with the process of FIG. 1, and that the width of the sheet W will vary accordingly.

It will also be understood that shingles in accordance with FIG. 1 may be made from sheets having multiples of the width W.

DETAILED DESCRIPTION OF THE PREFERRED EMBODIMENTS

With reference now to FIGS. 3–6, preferred embodiments in accordance with the present invention are illustrated.

Figures 3, 4:
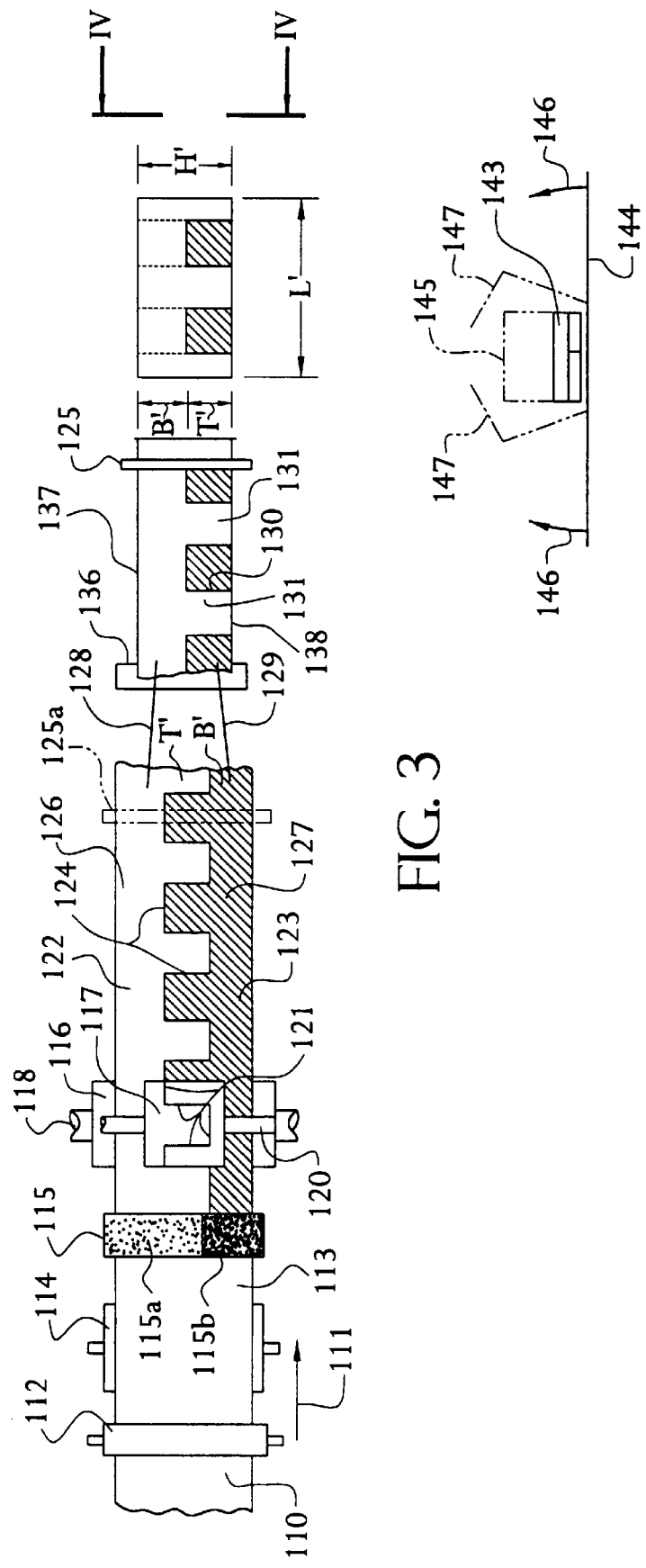
FIG. 3 is a view somewhat similar to that of FIG. 1, but wherein shingles of the present invention are made in accordance with the process of the present invention.
FIG. 4 is a view somewhat similar to that of FIG. 2, but taken generally along the line IV—IV of FIG. 3, wherein shingles of the present invention may be stacked, and packaged, as shown in phantom in FIG. 4.

In FIG. 3, a generally continuous web 110 of preferably fiberglass mat is provided, although the same can be wholly or partly of organic fiber, if desired. The web 110 travels from left to right in the direction of the arrow 111, under an applicator 112, where a bitumin coating is applied. The applicator 112 can be a pair of opposed rollers applying the coating, a bitumin bath, or the like, as desired.

The bitumin coated web 113 may then be passed over a suitable backcoating roller conveyor 114 or the like, as desired, and the coated web 113 is delivered to a granule application zone 115. In zone 115, a hopper or the like delivers granules which may, if desired, comprise lighter granules 115a and darker granules 115b from suitable sections of the granule applicator 115, whereby the granules are dispersed on the upper surface of the sheet, as shown, adhering to the bitumin coating on the mat as the sheet is delivered from left-to-right.

The sheet then passes between a pair of rollers 116, 117, respectively shaft-mounted at 118, 120. The upper roller 117 has a plurality of severing or cutting blades 121 on its peripheral surface such that, as the cylindrical member 117 rotates, it severs the sheet 113 into a pair of parallel sub-sheets 122, 123 with a cut line 124 between them that defines complemental tabs in sub-sheets.

The shingle layers thus made; namely layers 126, 127 are separated as shown by arrows 128, 129 and comprise the secondary and base layers of shingle in accordance with the present invention, and are each preferably of a height H', each of which is comprised of a tab zone T' and a butt zone B'. Voids 130 cut into the tab zones T' of the shingle layers 126, 127 by means of the cutting mechanism 117, creates spaced-apart tabs 131 in the shingle layers 126, 127. An adhesive applicator 136 of the roller or other suitable type is provided for applying adhesive to the underneath of layer 126 before the layers 126, 127 are brought together via arrows 128, 129 (shown between fragmentally illustrated layers 126, 127 in FIG. 3).

As the shingle layers 126 and 127 are brought together with adhesive therebetween, there is thus provided a laminated shingle of two layers. In this regard, it will be noted that, as laminated together, the butt zone B' of the base layer 127 is disposed against the bottom surface of the tab zone T' of the secondary layer 126, and the tab zone T' of the base layer 127 is disposed against the bottom surface of the butt zone B' of the secondary layer 126.

The laminated-together shingle layers 126, 127 then pass beneath a suitable cutting blade 125 or the like, which severs the continuous laminated-together double layer of shingle material into discrete shingles of predetermined length L'. As an alternative, the cutting could occur prior to the laminating step via cutting blade 125a, shown in phantom in FIG. 3.

It will be noted, as aforesaid, that the granule-depositing hopper 115 may be provided with a section having lighter granules 115a, and a section having darker granules 115b, for creating a zone of darker granules in the butt zone B' of one of the sub-sheets of shingle material. This is to provide the facility for providing different visual effects, whereby, after the shingles are laminated together, portions of the butt zone B' of shingle layer 127 that are visible through the voids 130 of shingle layer 126 may provide a contrast of darker and lighter granules, with the darker granule surface being broken up by tabs 131 of shingle layer 126, as shown at the right of FIG. 3, if desired. It will be apparent that many other variations can be achieved with application of granules of different shading, different colors, etc., as may be desired.

With particular reference to FIG. 4, it will be seen that a plurality of multi-layer shingles 143 may be packaged together, all similarly oriented, without requiring a re-orienting step of the prior art type discussed above with reference to FIG. 2. In this regard, a package may readily be formed by placing a wrapping material 144 to receive a plurality of similarly oriented shingles 143 therein, stacked as shown in phantom at 145, with opposite edges of the wrapping 144 being folded upward in the direction of the arrows 146, as shown in phantom at 147, to comprise a wrapped package as shown.

Figure 5:
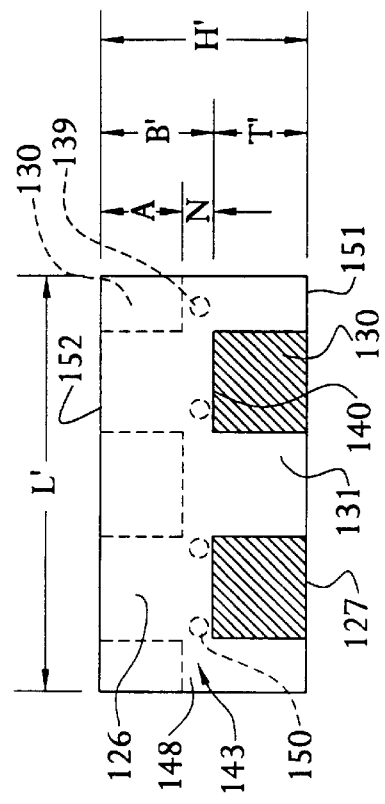
FIG. 5 is a top plan view of a shingle in accordance with the present invention, whereby a secondary layer is disposed on top of a base layer, forming a laminated shingle.

With reference now to FIG. 5, it will be seen that the laminated shingle 143 is provided with a double-layer nailing strip 148 running from left to right as shown in FIG. 5, of a height N. The height N is the distance measured between the lowermost portion 139 of a void 130 (shown in phantom) in base layer 127 and the upper edge 140 of the void 130 (shown in full lines) in FIG. 5, with the nailing strip or band 148 running completely across the shingle from its left edge to right edge, also as shown in FIG. 5. Thus, a plurality of nails 150, as shown in phantom, or other suitable fasteners such as staples or the like, may be applied as the shingle 143 is secured to a roof. This nailing band is generally parallel to the upper and lower edges 137, 138 of the shingle layers, and between said edges 138, 139, and is continuous along the laminated layers until the layers are severed by tool 125, after which the nailing band is the length L.

For a shingle that is of a height H' of 18 inches, such that its tabs T' represent cuts of 8 inches above a lower edge 151 of secondary layer 126, and wherein the butt zone B' is 10 inches in height and wherein each of the voids 130 are of a height A of 8 inches, the height of the nailing strip N is 2 inches. The 2 inch nailing strip of the present invention is particularly desirable when the shingles 143 are being applied to a very steep roof, because the weight of the shingle, when applied to a steep roof, bears more heavily on the nails 150 than in the case of a roof of gentler slope. In accordance with the present invention, the nails 150 have greater ability to engage the shingle in the nailing zone N, if they can engage both layers of the shingle. Also, in accordance with the present invention, tab zones T' of the shingle 127, as for example, can be seen in FIG. 5, provides shingle material well above nails located therebeneath.

It will thus be seen that, particularly for double layer shingles, wherein each of the base and secondary layers of the shingle have voids measured inwardly a distance "A", from the adjacent edge (the upper edge of the base layer and the lower edge of the secondary layer), where the upper and lower edges of the layers of shingles are superimposed as shown in FIG. 5, the shingle height H' will equal 2 A+N.

Thus, for a shingle height H' of 18 inches and where the height of the void A for each of the shingle layers is 8 inches, the nailing strip N will be 2 inches high. Also, for a shingle wherein the height H' is 12 inches, and wherein the void is cut into a shingle layer to a height from the edge 151 or 152, an amount A of 5 inches each, the height of the nailing strip N will also be 2 inches. In both cases, such shingles are of a length L' of 36 inches, although variations in length may likewise be provided.

It will also be understood that, within the broadest aspects of this invention, there could be some variation in the height A of the voids, between base and secondary layers of the shingle, as may be desired, and in such cases, for a shingle of a given height H', such may vary the height N of the double layer nailing strip. However, it will generally be desirable that the double layer nailing strip be of a height N that is greater than 1 inch, for facilitating a desirable nailing height.

Figure 6:
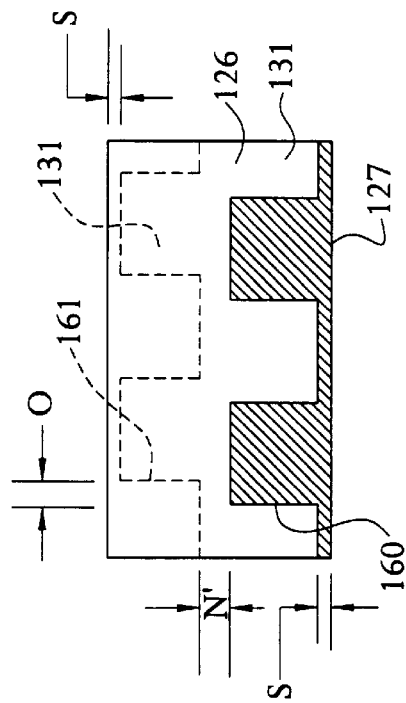
FIG. 6 is a view similar to that of FIG. 5, but wherein the base layer is offset slightly downwardly, and to the right, relative to the secondary layer disposed thereon.

With reference to FIG. 6, it is seen that there is a lateral offset between edges of voids that define the tab junctures between edges 160, 161, whereby the complemental cuts 124, whereby tabs and voids, having been cut from the same sheet, need not be aligned from base layer to secondary layer. Thus, the offset "O" shown in FIG. 6 represents a degree of misalignment between the base and secondary layers. Also, it will be noted that the base layer is vertically offset relative to the secondary layer 127, by a vertical amount S, with the base layer protruding below lower edges of tabs 131 an amount that provides a generally horizontal shadow effect, which provides a simulated greater thickness for the shingle, when a plurality of shingles are laid-up on a roof. Where there is such an offset S at the lower edge of the shingle as shown in FIG. 6, the upwardly extending tabs 131 of base shingle layer 127 also stop short of the upper edge of secondary shingle layer 126, by an amount S, as shown. Such a vertical offset will thereby reduce the height of the nailing zone from that N to an amount N', as shown in FIG. 6.

It will thus be apparent that the invention allows for a reduction in the amount of material that is necessary to make a shingle having two "full height" layers, even though voids comprise some of the portions of the shingle of each layer. In this regard, it will be seen that a sheet 113 of bituminous coated web can be of a width W' of 28 inches, in order to produce shingles having heights H' of 18 inches, and that sheets having a width W' of 19 inches can produce shingles having an overall height H' as shown in FIG. 5 of 12 inches.

Furthermore, the present invention facilitates stacking of the shingles as described with reference to FIG. 4, without requiring a flipping-over, re-orientation of shingles as in the prior art illustration of FIG. 2, and without requiring an opposite re-orientation by the roofing contractor upon applying the shingles to a roof. Rather, the shingles, upon being removed from their wrapper 144 for use in applying to a roof, are all oriented in the same way; i.e., all preferably facing upwardly.

The present invention also efficiently uses shingle material by using a shingle base layer that essentially transcends from the lower edge of the shingle to the upper edge, but because of voids in the base layer that are covered by the secondary layer, omits use of some of the weight of shingle material, and thereby reduces to some extent, the weight of the finished shingle where such material is not needed; namely in some portions of the butt zone of the base shingle layer, yet allowing efficient stacking of shingles one upon the other to result in a flat bundle.

It will be apparent from the foregoing that various modifications may be made in the details of construction, the method of making and using shingles, and the method of packaging shingles, all within the spirit and scope of the invention as defined in the appended claims.

We claim:

1. A package of multi-layer shingles, each shingle comprising:
   (a) a base layer of shingle having a butt zone and a tab zone, upper and lower and side edges and top and bottom surfaces, with bituminous coated web between the surfaces, and with granules applied to the top surface thereof;
   (b) a secondary layer of shingle having a butt zone and tab zone, upper and lower and side edges and top and bottom surfaces, with bituminous coated web between the surfaces and with granules applied to the top surface thereof;
   (c) means laminating said layers together, with granules of the base layer sandwiched between laminated layers, with the butt zone of the base layer disposed against the bottom surface of the tab zone of the secondary layer and with the tab zone of the base layer disposed against the bottom surface of the butt zone of the secondary layer; and
   (d) with shingles in the package having bottom surfaces of base layers of shingles disposed against top surfaces of secondary layers of shingles, and with means wrapping the shingles together.

2. The package of claim 1, wherein for each shingle in the package, there are spaced apart tabs in the tab zones of each said layer, separated by at least one void in each said layer between tabs of that layer, with the tabs of the base layer extending inwardly from an upper edge of the base layer, and with the tabs of the secondary layer extending inwardly from a lower edge of the secondary layer.

3. The package of claim 2, wherein for each shingle of the package:
   (a) with the at least one void of the base layer being of a height substantially "A" measured inwardly from an upper edge of the base layer;
   (b) with the at least one void of the secondary layer being of a height substantially "A" measured inwardly from a lower edge of the secondary layer; and
   (c) said shingle having a height of substantially at least 2 A plus N, where N is the height, greater than 1 inch, of substantially complete double layer overlap between side edges of shingle layers, inward of upper and lower layer edges, whereby a double layer nailing strip of greater height than 1 inch is provided substantially completely across the overlapped layers of the shingle.

4. The package of claim 3, wherein N equals approximately 2 inches, whereby the nailing strip is approximately 2 inches in height.

5. The package of claim 4, wherein for each shingle in the package the nailing strip is approximately midway between the upper and lower edges of the shingle.

6. The package of any one of claims 3 or 4, wherein A is approximately 8 inches.

7. The package of claim 6, wherein for each shingle in the package the height of the shingle is approximately 18 inches.

8. The package of any one of claims 3 or 4, wherein for each shingle in the package, A is approximately 5 inches.

9. The package of claim 8, wherein for each shingle in the package, the height of the shingle is approximately 12 inches.

10. The package of any one of claims 2–4, wherein for each shingle in the package, at least one tab and at least one void of said secondary layer is of complemental configuration to said at least one void and said at least one tab, respectively, of said shingle base layer.

11. The package of claim 10, wherein for each shingle in the package, said at least one tab of said base layer is substantially aligned with said complementally configured at least one void of said secondary layer.

12. The package of any one of claims 1–4, wherein the shingles inside the package, when disposed on a flat, generally horizontal surface, form a stack in which the top and bottom surfaces of each shingle in the stack are in generally flat planes, with all said planes being substantially parallel to each other.

13. A stack of shingles, with each shingle in the stack comprising:

(a) a base layer of shingle having a butt zone and a tab zone, upper and lower and side edges and top and bottom surfaces, with bituminous coated web between the surfaces, and with granules applied to the top surface thereof;

(b) a secondary layer of shingle having a butt zone and tab zone, upper and lower and side edges and top and bottom surfaces, with bituminous coated web between the surfaces and with granules applied to the top surface thereof;

(c) means laminating said layers together, with granules of the base layer sandwiched between laminated layers, with the butt zone of the base layer disposed against the bottom surface of the tab zone of the secondary layer and with the tab zone of the base layer disposed against the bottom surface of the butt zone of the secondary layer; and (d) with said shingles in the stack each lying flat when disposed on a horizontal surface.

14. The stack of shingles in accordance with claim 13, with each shingle in the stack having its exposed edges facing in the same direction of comparable edges of each other shingle in the stack.

* * * * *